United States Patent
Linhart et al.

(10) Patent No.: US 6,190,503 B1
(45) Date of Patent: Feb. 20, 2001

(54) PROCESS FOR CLEANING WASTEWATER AND RECIRCULATING WATER IN PAPER PRODUCTION, DE-INKING AND BLEACHING OF PULP

(75) Inventors: Friedrich Linhart, Heidelberg; Manfred Niessner, Schifferstadt; Martin Rübenacker, Altrip; Claudia Nilz, Rödersheim-Gronau, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/147,846

(22) PCT Filed: Sep. 9, 1997

(86) PCT No.: PCT/EP97/04909

§ 371 Date: Mar. 19, 1999

§ 102(e) Date: Mar. 19, 1999

(87) PCT Pub. No.: WO98/12143

PCT Pub. Date: Mar. 26, 1998

(30) Foreign Application Priority Data

Sep. 20, 1996 (DE) .............................. 196 38 594

(51) Int. Cl.⁷ .................. D21F 1/66; C02F 1/28
(52) U.S. Cl. .................. 162/189; 162/190; 162/DIG. 8; 210/660; 210/683; 210/692; 210/928
(58) Field of Search .................. 162/189, 190, 162/DIG. 8; 210/680, 692, 690, 660, 734, 735, 912, 928

(56) References Cited

U.S. PATENT DOCUMENTS 5,476,594 * 12/1995 Collins et al. ................ 210/734
5,599,898 * 2/1997 Hartmann et al. ............ 528/310

FOREIGN PATENT DOCUMENTS

WO 89/11900 * 12/1989 (WO).

* cited by examiner

Primary Examiner—Dean T. Nguyen
(74) Attorney, Agent, or Firm—Oblon, Spivak, McClelland, Maier & Neustadt, P.C.

(57) ABSTRACT

Wastewaters and circulation waters in papermaking, in deinking and in pulp bleaching are treated by adsorption of water-soluble anionic compounds and compounds dispersed in water from the wastewaters and circulation waters over finely divided adsorbents which consist of insoluble, only slightly swellable polymers which contain polymerized vinylamine units, and these polymers are used as adsorbents for treating water circulations in papermaking and for treating paper machine wastewaters and wastewaters from the deinking process and from pulp bleaching.

8 Claims, No Drawings

PROCESS FOR CLEANING WASTEWATER AND RECIRCULATING WATER IN PAPER PRODUCTION, DE-INKING AND BLEACHING OF PULP

BACKGROUND OF THE INVENTION

1. Field of the Invention

The present invention relates to a process for treating wastewaters and circulation waters in papermaking, in deinking and in pulp bleaching by adsorption of water-soluble anionic compounds and compounds dispersed in water from the wastewaters and circulation waters over a finely divided adsorbent and the use of finely divided, water-soluble, only slightly swellable polymers, which contain polymerized vinylamine units, as adsorbents.

2. Description of the Background

Since the water circulations in the paper mills become increasingly concentrated, anionic compounds accumulate in the recycled water and very adversely affect the efficiency of cationic polymeric process chemicals in the drainage of paper stock and the retention of fillers and fibers. In practice, water which is completely or at least partly recycled to the paper machine is used for the production of the paper stock. This is either clarified or unclarified white water or a mixture of such water qualities. The recycled water contains smaller or larger amounts of interfering substances which are known to have a very adverse effect on the efficiency of cationic drainages and retention aids as well as other process chemicals. The content of the interfering substances in the paper stock can be characterized, for example, by the cumulative parameter of chemical oxygen demand (COD). The COD of such paper stock are, for example, 300–30,000, in general 1000–20,000 mg of oxygen/kg of the aqueous phase of the paper stock. These amounts of interfering substances greatly impair the efficiency of cationic process chemicals as long as they are used in papermaking in the absence of fixing agents.

To remove the interfering substances from the white water, for example, drainage of these paper stocks is additionally carried out in the presence of a fixing agent. The fixing agents used are, for example, condensates of dicyandiamide and formaldehyde or condensates of dimethylamine and epichlorhydrin (cf. Tappi Journal 8 1988, 131). EP-A-0 438 707 discloses a process in which water-soluble hydrolyzed homo- and/or copolymers of N-vinylformamide with a degree of hydrolysis of at least 60% are used as fixing agents for interfering substances.

EP-A-0 649 941 describes a process in which water-soluble polymers containing vinylamine units are used in order to remove undesired impurities, for example resins, from the white water. U.S. Pat. No. 5435921 discloses the use of such polymers in combination with other polymers for decolorizing the paper stock.

Wochenblatt für Papierfabrikation 16 (1990), 709, and the literature cited there describe processes in which the dissolved interfering substances are coagulated, for example by means of positively charged polymers, flocculated and finally removed from the water by sedimentation, flotation or filtration. Wochenblatt für Papierfabrikation 7 (1981), 225 discloses a corresponding process for treating water in the deinking process. A process for removing ligninsulfonates by precipitation with water-soluble cationic oligomers and polymers is described in EP-A-0 049 831. However, this process requires very complicated working-up of the precipitated material with the use of chlorinated organic solvents, so that it is not feasible for economic and especially ecological reasons.

The use of solids having a large surface area as adsorbents, for example active carbon, is also known. Macroporous ion exchangers and adsorber resins are also suitable. Their use for treating pulp bleaching liquors, paper machine circulation waters and papermill wastewaters is described in Wochenblatt für Papierfabrikation 7 (1981), 205.

However, none of these adsorption processes have become established in the pulp industry and in particular in the paper industry. This is due on the one hand to the high costs of the adsorbents used, but also to their high selectivity, their insufficient capacity for the large amounts of different dissolved anionic substances and dispersed anionic solid particles and the relatively slow adsorption processes which are determined, for example, by the penetration rate of the dissolved or dispersed, oligomeric and polymeric compounds. In the process in which the dissolved anionic substances are coagulated in the circulation water, the disadvantages likewise predominate over the advantages. Although the reaction between coagulant and material to be precipitated is very rapid owing to the reaction in the homogeneous phase, the consumption of expensive chemicals is very high because they have to be used in stoichiometric amounts and finally cannot be recovered. The precipitated coagulum must furthermore be disposed. Another disadvantage is the highly complicated logistics of at least two different process chemicals and of course the expensive apparatuses for separating off the coagulum in the flotation plants and possibly for thickening the flotation liquors.

EP-A-0667 874 discloses insoluble, only slightly swellable amino-containing polymers which are obtainable, for example, from popcorn polymers which contain vinylformamide units by eliminating formyl groups from the polymerized vinylformamide units with formation of vinylamine units. The amino-containing popcorn polymers are used, for example, as ion exchangers or adsorber resins for metal ions.

SUMMARY OF THE INVENTION

It is an object of the present invention to provide an improved process for treating wastewaters and circulation waters in papermaking, in deinking and in pulp bleaching, in which water-soluble anionic compounds and compounds dispersed in water are eliminated.

We have found that this object is achieved, according to the invention, by a process for treating wastewaters and circulation waters in papermaking, in deinking and in pulp bleaching by adsorption of water-soluble anionic compounds and compounds dispersed in water from the wastewaters and circulation waters over finely divided adsorbents if the finely divided adsorbents used are insoluble, only slightly swellable polymers which contain vinylamine units.

The suitable polymers are also referred to as popcorn polymers. They are virtually insoluble in all solvents and only slightly swellable therein. The popcorn polymers to be used according to the invention are disclosed in EP-A-0 667 874. They are obtainable by copolymerizing (a) N-vinylcarboxamides of the formula

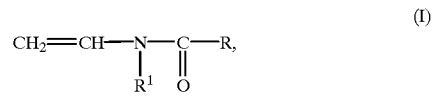

where R and $R^1$ are each H or $C_1$–$C_6$-alkyl, and, if required, (b) other monoethylenically unsaturated monomers copolymerizable with said N-vinylcarboxamides with (c) from 0.1 to 10% by weight, based on the monomers (a) and (b) used in the polymerization, of a compound containing at least two ethylenically unsaturated double bonds as a crosslinking agent in the absence of oxygen and polymerization initiators to give popcorn polymers, and eliminating the group

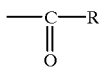

from at least 0.1% of the polymerized N-vinylcarboxamides of the formula I with the formation of vinylamine units of the formula

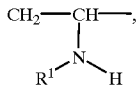

(II)

where $R^1$ is H or $C_1$–$C_6$-alkyl.

DETAILED DESCRIPTION OF THE PREFERRED EMBODIMENTS

Examples of suitable compounds of the formula I—monomers of group (a)—are N-vinylformamide, N-vinyl-N-methylformamide, N-vinylacetamide, N-vinyl-N-methylacetamide, N-vinyl-N-ethylformamide, N-vinyl-N-n-propylformamide, N-vinyl-N-isopropylformamide, N-vinyl-N-isobutylformamide, N-vinyl-N-methylpropionamide, N-vinyl-N-butylacetamide and N-vinyl-N-methylpropionamide. N-vinylformamide is preferably used from this group of monomers. The polymers contain, for example, 10 to 99.9% by weight of the monomers of group (a).

Monomers of group (b), which may be concomitantly used in the preparation of the popcorn polymers, are other monoethylenically unsaturated monomers copolymerizable with monomers of group (a) and (c). These include, for example, acrylamide, methacrylamide, acrylic acid, methacrylic acid, acrylates, methacrylates and/or vinyl esters. The acrylates and methacrylates are preferably derived from saturated, monohydric alcohols of 1 to 4 carbon atoms or saturated dihydric alcohols of 2 to 4 carbon atoms. Examples of these esters are methyl acrylate, methyl methacrylate, ethyl acrylate, ethyl methacrylate, n-propyl acrylate, n-propyl methacrylate, isopropyl acrylate, isopropyl methacrylate and the esters of acrylic acid and methacrylic acid which are derived from the isomeric butanols, as well as hydroxyethyl acrylate, hydroxyethyl methacrylate, hydroxypropyl acrylate, hydroxypropyl methacrylate, hydroxybutyl acrylate, hydroxyisobutyl acrylate and hydroxyisobutyl methacrylate. Preferred vinyl esters are vinyl acetate and vinyl propionate. Further suitable monomers of group (b) are acrylonitrile, methacrylonitrile, N-vinylpyrrolidone, N-vinylcaprolactam, 1-vinylimidazole, 2-methyl-1-vinylimidazole and 4-methyl-1-vinylimidazole. The monomers of group (b), alone or as a mixture with one another, may be polymerized together with the monomers of groups (a) and (c). Among the monomers of group (b), N-vinylpyrrolidone is particularly suitable for the preparation of popcorn polymers. Popcorn polymerization can be initiated, for example, by heating N-vinylpyrrolidone and small amounts, for example from 0.4 to 1.2% by weight, of a crosslinking agent, such as N,N'-divinylethyleneurea, in an aqueous medium in the presence of an alkali. Freshly distilled N-vinylpyrrolid-2-one is preferably used for initiating the popcorn polymerization. The popcorn polymerization takes place particularly readily with N-vinylpyrrolidone at from about 100 to 150° C. in the absence of oxygen and polymerization initiators.

If they are used in the preparation of popcorn polymers, the monomers of group (b) are present in an amount of from 0.1 to 80% by weight in the monomer mixture of (a) and (b).

Compounds which contain at least two ethylenically unsaturated double bonds in the molecule are used in the polymerization as the monomers of group (c), ie. as crosslinking agents. For example, alkylenebisacrylamides, such as methylenebisacrylamide, and N,N'-acryloylethylenediamine, N,N'-divinylethyleneurea, N,N'-divinylpropyleneurea, ethylidenebis-3-(N-vinylpyrrolidone), N,N'-divinyl-2,2'-diimidazolylbutane and 1,1'-bis(3,3'-vinylbenzimidazolin-2-one)-1,4-butane are particularly suitable. Other suitable crosslinking agents are, for example, alkylene glycol di(meth)acrylates, such as ethylene glycol diacrylate, ethylene glycol dimethacrylate, tetraethylene glycol diacrylate, tetraethylene glycol dimethacrylate, diethylene glycol diacrylate and diethylene glycol dimethacrylate, aromatic divinyl compounds, such as divinylbenzene and divinyltoluene, and vinyl acrylate, allyl acrylate, allyl methacrylate, divinyldioxane, pentaerythrityl triallyl ether and mixtures of the crosslinking agents. The crosslinking agents are used in amounts of from 0.1 to 10, preferably from 1 to 4% by weight, based on the monomers (a) and (b) used in the polymerization.

The popcorn polymerization is carried out by known methods, for example as precipitation polymerization or by mass polymerization. A preferred procedure is one in which, as described in EP-B-0 177 812, the popcorn polymerization is initiated by heating a mixture of from 99.6 to 98.8% by weight of N-vinylpyrrolidone and, as a crosslinking agent, from 0.4 to 1.2% by weight of a compound having at least two ethylenically unsaturated double bonds to 100 to 150° C. in the absence of oxygen and polymerization initiators. The polymerization is initiated in particular by the presence of small amounts of sodium hydroxide solution or potassium hydroxide solution. A polymerizable popcorn polymer forms within a short time and, with the addition of suitable other monomer mixtures, ie. the monomers of group (a) and, if required, (b) and further addition of the monomers (c), initiates the popcorn polymerization of these monomers without an induction period. The popcorn polymerization is preferably carried out in water at monomer concentrations of, for example, 5 to 30% by weight at, for example, from 20 to 200° C. and a pH above 6.

The popcorn polymers can be isolated from the aqueous solution, purified and then hydrolyzed. However, it is also possible to subject the aqueous suspension of the popcorn polymers directly to hydrolysis. In the hydrolysis, groups of the formula -CO-R, where R has the meanings stated for the formula I, are eliminated from the polymerized units of the formula I with formation of vinylamine units of the formula II.

The hydrolysis of the popcorn polymers is preferably carried out in aqueous suspension at a solids content of from 1 to 20% by weight at from 20 to 15° C., preferably from 50 to 110° C. Depending on the reaction time and reaction temperature and on the amount of hydrolyzing agent, it is continued until at least 0.1%, preferably at least 20% to 100%, or, in the case of partial hydrolysis, up to 99%, of the N-vinylcarboxamide units contained in the polymers have been hydrolyzed. The hydrolyzing agents used are acids, bases or enzymes.

Suitable acids are, for example,- mineral acids, such as hydrogen halide (gaseous or in aqueous solution), sulfuric acid, nitric acid or phosphoric acid (orthophosphoric, metaphosphoric or polyphosphoric acid), or organic acids, for example $C_1$–$C_5$-carboxylic acids such as formic acid, acetic acid or propionic acid, or aliphatic and aromatic sulfonic acids, such as methanesulfonic acid, benzenesulfonic acid or toluenesulfonic acid. In the hydrolysis with acids, the pH is, for example, from 0 to 5. For example, from 0.05 to 1.5, preferably from 0.4 to 1.2, equivalents of acids are required per carboxyl radical to be eliminated in the polymer.

In the hydrolysis with bases, hydroxides of metals of the first and second main groups of the Periodic Table can be used, for example lithium hydroxide, sodium hydroxide, potassium hydroxide, calcium hydroxide, strontium hydroxide and barium hydroxide. However, ammonia or alkyl derivatives of ammonia, for example alkylamines or arylamines, such as triethylamine, monoethanolamine, diethanolamine, triethanolamine, morpholine, piperidine, pyrrolidine or aniline, are also suitable. In the hydrolysis with bases, the pH is from 8 to 14. The bases may be used in the solid, liquid or, if required, also gaseous state, dilute or undiluted. Ammonia, sodium hydroxide solution or potassium hydroxide solution is preferably used. The hydrolysis in the acidic or alkaline pH range is carried out, for example, at from 20 to 170° C., preferably from 50 to 120° C. It is complete after from about 2 to 8, preferably from 3 to 5, hours. A procedure in which the acids or bases are added in aqueous solution has proven particularly useful. After the hydrolysis, a neutralization is generally carried out so that the pH of the hydrolyzed polymer solution is from 2 to 8, preferably from 3 to 7. Neutralization is required when it is intended to prevent or delay the continuation of the hydrolysis of partially hydrolyzed polymers. For the further processing, hydrolysis with the aid of bases has the advantage that there is no need for an addition neutralization step.

Hydrolysis can also be carried out with the aid of enzymes, for example proteases, ureases or amidases. However, it is preferably carried out using acids or bases.

After acidic hydrolysis, the popcorn polymers containing amine functions are generally present as salts, the corresponding acid anions or anions of the liberated carboxylic acids, for example formate, being suitable as opposite ions. In order to obtain polymers in which some or all of the amino groups are free, the popcorn polymers are partially or completely deprotonated in aqueous suspension by adding bases. Particularly suitable bases are alkali metal and alkaline earth metal hydroxides, in particular sodium hydroxide, alkali metal and alkaline earth metal carbonates, in particular sodium carbonate, ammonia and alkyl derivatives of ammonia. The salts formed in the neutralization, for example sodium sulfate, remain in aqueous solution. After basic hydrolysis, the popcorn polymers are present as free bases. In order to obtain the salt form partially or completely therefrom, the hydrolyzed polymers are protonated in aqueous suspension with acids. Suitable acids are, for example, mineral acids, preferably hydrochloric or sulfuric acid, or organic acids, such as $C_1$–$C_5$-carboxylic acids or aliphatic and aromatic sulfonic acids. If the popcorn polymers are only partially hydrolyzed, they also contain units of N-vinylcarboxamides of the formula I, for example in amounts of from 1 to 99% by weight, in addition to vinylamine units.

The popcorn polymers containing polymerized vinylamine units can be isolated from the aqueous solution by filtering or centrifuging the reaction mixture with subsequent washing out with water and drying in a conventional dryer, such as a through-circulation or vacuum drying oven, a paddle dryer or a pneumatic dryer. The yield achievable in practice is usually more than 90, in general more than 99%, of the theoretical yield. The mean particle diameter of the finely divided popcorn polymers containing vinylamine units is, for example, from 0.0 to 10 mm, preferably from 0.5 to 5 mm.

The insoluble popcorn polymers containing polymerized vinylamine units are used, according to the invention, for removing anionic compounds, such as water-soluble polyanionic interfering substances and colored substances, as well as insoluble impurities and resins from circulation waters and wastewaters in the papermaking process, in the deinking process and in pulp bleaching. Surprisingly, it was found that the advantages of an adsorbent can be combined with the advantages of a cationic polymer, for example its rapid and quantitative reaction, without having to accept the disadvantages of the prior art processes. This is achieved by bringing the water to be treated into close contact with the finely divided popcorn polymers described above, which contain basic amine functions. In acidic to weakly alkaline waters, as encountered in the paper industry, the amino groups on the large surface of the polymers are for the most part protonated and thus carry a positive charge. Owing to the high charge density, all anionic substances which come into contact with the cationic surface are immediately adsorbed, regardless of their chemical composition in other respects. This also applies to anionic water-insoluble dispersed particles and even to sparingly soluble, monobasic organic acids and anions thereof, eg. abietic acid or phenol resins.

The problem of the removal of anionic substances for circulated waters or from wastewaters occurs, for example, in papermaking. These compounds can be quantitatively determined, for example with the aid of the COD values, which are, for example, from 300 to 30,000, in general from 1000 to 20,000 mg of oxygen per kg of aqueous phase. On the other hand, the chemical composition of the anionic substances has not been fully determined. Such substances may be components of the fibers or humic acid. Anionic dyes are also to be understood under the definition of anionic substances which is used in the present context.

Suitable fibers for producing the pulps are all qualities usually used for this purpose, for example mechanical pulp, bleached and unbleached chemical pulp and paper stocks from all annual plants. Mechanical pulp includes, for example, groundwood, thermomechanical pulp (TMP), chemothermomechanical pulp (CTMP), pressure groundwood, semichemical pulp, high-yield pulp and refiner mechanical pulp (RMP). Suitable chemical pulps are bleached and unbleached sulfate, sulfite and soda pulps. Suitable annual plants for the preparation of paper stocks are, for example, rice, wheat, sugarcane and kenaf. Waste paper, either alone or as a mixture with other fibers, is also used for producing the pulps.

Pulps of the type described above contain smaller or larger amounts of interfering substances which, as explained above, can be detected with the aid of the COD or with the aid of the cationic demand. The cationic demand is understood as meaning that amount of a cationic polymer which is required to bring a defined amount of white water to the isoelectric point. Since the cationic demand depends to a very great extent on the composition of the cationic retention aid used in each case for the determination, a polyamidoamine obtained according to Example 3 of DE-C-2 434 816 from adipic acid and diethylenetriamine, grafted with ethyleneimine and crosslinked with polyethylene glycol dichlorohydrin ether was used for standardization. The pulps containing interfering substances have the above-mentioned COD values of from 300 to 30,000 and, for example, a cationic demand of more than 50 mg of polymer/l of white water.

The popcorn polymers containing vinylamine units can be used, for example, by a procedure in which the water to be treated is allowed to flow through a polymer layer present on a sieve. However, the water to be treated can also be allowed to flow through a tube filled with polymer. A further possibility is to allow the water to flow from bottom to top through a chamber, a tube or a similar closed container in the manner of a fluidized bed process, the amount of polymer present in this container being not more than that which still permits easy fluidization. This also substantially excludes the danger of blockage of the filters and sieves which are intended to prevent loss of the polymer. It is not necessary to remove all anionic compounds at once from the water, especially when the water is circulation water. It may also be sufficient to treat only a part of the circulation water, for example in a secondary loop downstream of the novel process. For the papermaker, for example, it is important that the amount of interfering substances does not exceed a certain level or that the interfering substances are removed to an extent to which they are not discharged by another method, for example with the paper, or to the extent to which they enter the paper machine together with the raw materials.

In papermaking, for example, the circulation water of a paper machine can be passed through a layer consisting of a finely divided adsorbent, or the wastewater of a paper machine is passed through a layer consisting of a finely divided adsorbent. It is also possible to pass the wastewater from a deinking process or the wastewater obtained in pulp bleaching through a layer consisting of a finely divided adsorbent. However, the finely divided adsorbent can also be fluidized in the wastewater, in the circulation water of a paper machine or in the wastewater from a deinking process or from pulp bleaching and can be separated therefrom in each case, for example by centrifugation or filtration.

The present invention also relates to the use of finely divided, insoluble, only slightly swellable polymers which contain polymerized vinylamine units as adsorbents for treating water circulations in papermaking and for treating paper machine wastewaters and wastewaters from the deinking process and from pulp bleaching. It is particularly preferable to use insoluble, only slightly swellable polymers which are obtainable by copolymerizing monomer mixtures comprising (a) from 24.5 to 95% by weight of N-vinylformamide,
(b) from 4.5 to 75% by weight of N-vinylpyrrolidone and
(c) from 0.5 to 5% by weight of divinylethyleneurea, the sum of the monomers (a), (b) and (c) always being 100% by weight, to give popcorn polymers and subsequently eliminating formyl groups from at least 10% of the polymerized N-vinylformamide units with formation of vinylamine units.

A particular advantage of this process is that the polymer containing the vinylamine units can be extremely readily regenerated after it has been saturated with anionic compounds. In contrast to ion exchange resins, it need not be converted back into the active state by slow displacement processes with opposite ions. Instead, it is simply treated with a strong and simultaneously economical inorganic base, such as sodium hydroxide solution or sodium carbonate solution. The positively charged ammonium functions are deprotonated and their charge thus eliminated, as a result of which they lose the ability to bind the oppositely charged substances. These go spontaneously into solution at high pH, even if, like, for example, resin particles of fatty acids, they are supposed to have been sparingly soluble at the pH of the adsorption. The alkaline solutions of the interfering substances can readily be disposed of, for example by incineration, as is usual in the pulp industry. In knownprocesses for coagulation with cationic polyelectrolytes according to the prior art, recovery of the soluble coagulant from the isolated material containing interfering substances is technically possible but is not feasible from the economic and ecological points of view.

The popcorn polymer laden with interfering substances and containing vinylamine units is regenerated by a procedure in which, instead of the water to be treated, a just sufficient amount of solution of sodium hydroxide or sodium carbonate is allowed to run through the container which contains the polymer. Advantageously, the water to be treated is passed, during the regeneration, through a second container which is connected in parallel and equipped with valves in the same way as the first container, so that switching from water to be treated to regeneration solution and in the reverse direction can be carried out rapidly and easily. After the regeneration, the popcorn polymer can be converted back into the protonated and hence active form by adding an acid. In the case of circulation water of a paper machine, however, it is also sufficient simply to pass through the water to be treated, because its pH is sufficiently low to protonate the popcorn polymer adequately over a certain period. The conversion to cationic form and the adsorption then take place in part simultaneously.

In the examples which follow, percentages are by weight.

EXAMPLES

The following substances were used in the examples:

Popcorn Polymer 1

Water-insoluble, only slightly swellable polymer composed of 90.7% of vinylamine×½ $H_2SO_4$, 7.8% of N-vinylpyrrolidone and 1.5% of divinylethyleneurea, mean particle diameter from 0.5 to 5 mm.

Sodium ligninsulfonate and waterglass in aqueous solution were used as typical interfering substances as occur in the paper stock and used in the laboratory as model substances. Sodium ligninsulfonate was determined by spectrophotometry at a wavelength of 280 nm. The content of waterglass was determined by atomic emission spectroscopy of Si.

Example 1

500 ml of a 0.1% strength aqueous solution of sodium ligninsulfonate were stirred for 16 hours with 9 g of finely powdered popcorn polymer 1 at room temperature. The polymer was then filtered off and the content of remaining ligninsulfonate was determined in the filtrate. The decrease in concentration was 89.6%.

Example 2

A total of 480 ml of a 0.1% strength sodium ligninsulfonate solution was passed in the course of 8 hours at a throughput rate of 1 ml/min through a 50 ml titration burette filled with 9 g of finely powdered popcorn polymer 1. The decrease in concentration in this time was 68.5%.

Regeneration: A total of 240 ml of 2N sodium hydroxide solution was then passed in the course of 2 hours at a throughput rate of 2 ml/min through the titration burette filled with laden popcorn polymer. 95% of the adsorbed sodium ligninsulfonate were liberated again.

Example 3

500 g of a 5% strength soda waterglass solution were stirred for 16 hours with 7.5 g of finely powdered popcorn polymer at room temperature. Thereafter, the polymer was filtered off and the content of remaining waterglass was determined in the fitrate. The decrease in concentation was>99%.

We claim:

1. A process for treating waste waters and circulation waters in papermaking, in deinking and in pulp bleaching, comprising retaining insoluble impurities and absorbing water-soluble anionic compounds and compounds comprising phenolic resins and monobasic acids and anions thereof dispersed in water from the wastewaters and circulation waters over a finely divided absorbent, wherein the finely divided absorbent is an insoluble, only slightly swellable polymer which is prepared by copolymerizing (a) N-vinylcarboxamides of the formula

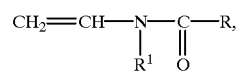

(I)

wherein R and $R^1$ are each H or $C_1$–$C_6$-alkyl, and (c) from 0.1 to 10% by weight, based on the monomer (a) of a compound containing at least two ethylenically unsaturated double bonds as a crosslinking agent, in the absence of oxygen and polymerization initiators to produce popcorn polymers, and eliminating the groups

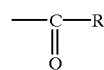

from at least 0.1% of the polymerized N-vinylcarboxamides of the formula I with the formation of vinylamine units of the formula

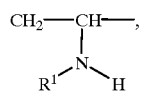

(II)

wherein $R^1$ is H or $C_1$–$C_6$-alkyl.

2. A process as claimed in claim 1, wherein the absorbents are insoluble, only slightly swellable polymers which are obtainable by copolymerizing monomer mixtures comprising (a) from 24.5 to 95% by weight of N-vinylformamide,
   (b) from 4.5 to 75% by weight of N-vinylpyrrolidone and
   (c) from 0.5 to 5% by weight of divinylethyleneurea, the sum of the monomers (a), (b) und (c) always being 100% by weight, to produce popcorn polymers, and subsequently eliminating formyl groups from at least 1% of the polymerized N-vinylformamide units with formation of vinylamine units.

3. The process as claimed in claim 1, wherein circulation water from a paper machine passes through a layer consisting of a finely divided adsorbent.

4. The process as claimed in claim 1, wherein wastewater from a paper machine passes through a layer consisting of a finely divided adsorbent.

5. The process as claimed in claim 1, wherein wastewater from a deinking process passes through a layer consisting of a finely divided adsorbent.

6. The process as claimed in claim 1, wherein wastewater obtained from pulp bleaching passes through a layer consisting of a finely divided adsorbent.

7. The process as claimed in claim 1, which comprises fluidizing the finely divided adsorbent in the wastewater or in the circulation water of a paper machine or in the wastewater from the deinking process or from pulp bleaching and separating these fluids from the finely divided adsorbent in each case.

8. A process for treating waste waters and circulation waters in papermaking, in deinking and in pulp bleaching, comprising retaining insoluble impurities and absorbing water-soluble anionic compounds and compounds comprising phenolic resins and monobasic acids and anions thereof dispersed in water from the waste waters and circulation waters over a finely divided absorbent, wherein the finely divided absorbent is an insoluble, only slightly swellable polymer which is prepared by copolymerizing (a) N-vinylcarboxamides of the formula

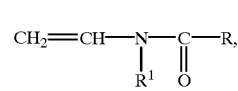

(I)

wherein R and $R^1$ are each H or $C_1$–$C_6$-alkyl, (b) other monoethylenically unsaturated monomers copolymerizable with said N-vinylcarboxamides, and (c) from 0.1 to 10% by weight, based on the monomers (a) and (b), of a compound containing at least two ethylenically unsaturated double bonds as a crosslinking agent, in the absence of oxygen and polymerization initiators to produce popcorn polymers, and eliminating the groups

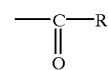

from at least 0.1% of the polymerized N-vinylcarboxamides of the formula I with the formation of vinylamine units of the formula

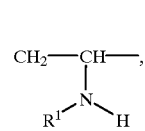

(II)

wherein $R^1$ is H or $C_1$–$C_6$-alkyl.

* * * * *